(12) United States Patent
Nakagawa et al.

(10) Patent No.: US 11,425,464 B2
(45) Date of Patent: Aug. 23, 2022

(54) COMMUNICATION DEVICE, COMMUNICATION CONTROL DEVICE, AND DATA DISTRIBUTION SYSTEM

(71) Applicant: Oki Electric Industry Co., Ltd., Tokyo (JP)

(72) Inventors: Satoshi Nakagawa, Tokyo (JP); Koji Sakurada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 64 days.

(21) Appl. No.: 16/874,508

(22) Filed: May 14, 2020

(65) Prior Publication Data

US 2020/0374592 A1 Nov. 26, 2020

(30) Foreign Application Priority Data

May 24, 2019 (JP) .............................. JP2019-097974

(51) Int. Cl.
*H04N 21/472* (2011.01)
*H04N 21/6405* (2011.01)
*H04N 21/643* (2011.01)
*H04N 21/433* (2011.01)

(52) U.S. Cl.
CPC ..... *H04N 21/47217* (2013.01); *H04N 21/433* (2013.01); *H04N 21/6405* (2013.01); *H04N 21/64322* (2013.01)

(58) Field of Classification Search
CPC ............... H04N 21/433; H04N 21/436; H04N 21/47217; H04N 21/6405; H04N 21/64322
See application file for complete search history.

(56) References Cited

U.S. PATENT DOCUMENTS

| | | | | |
|---|---|---|---|---|
| 2005/0283526 A1* | 12/2005 | O'Neal | ................. | H04L 67/104 709/223 |
| 2011/0219137 A1* | 9/2011 | Yang | ................. | H04L 29/12103 709/231 |
| 2016/0164935 A1* | 6/2016 | Chen | .................... | H04L 65/607 709/219 |

FOREIGN PATENT DOCUMENTS

JP  2007235681 A  9/2007

* cited by examiner

*Primary Examiner* — Farzana Hossain
(74) *Attorney, Agent, or Firm* — Rabin & Berdo, P.C.

(57) ABSTRACT

To reduce a waste of a network bandwidth and construct an efficient distribution tree.
The present invention relates to a communication device that is capable of redistributing multimedia data received from a distribution source device or another communication device to one or more other communication devices, the communication device including: a playback processing section configured to play and output corresponding media in accordance with playback media information indicating a media type designated by the own device; a media information storage section configured to store the playback media information of the own device and media information including respective pieces of playback media information of a child node and a descendant node on a route where the own device exists in the distribution tree; a media type control section configured to control a redistribution media type on a basis of the respective pieces of playback media information of the child node and the descendant node included in the media information; and a redistribution section configured to redistribute, to the child node, media data selected from the multimedia data on a basis of the redistribution media type.

8 Claims, 12 Drawing Sheets

COMMUNICATION DEVICE, COMMUNICATION CONTROL DEVICE, AND DATA DISTRIBUTION SYSTEM

CROSS REFERENCE TO RELATED APPLICATION(S)

This application is based upon and claims benefit of priority from Japanese Patent Application No. 2019-097974, filed on May 24, 2019, the entire contents of which are incorporated herein by reference.

BACKGROUND

The present invention relates to a communication device, a communication control device, and a data distribution system. For example, the present invention is applicable to a system that distributes multimedia data from a distribution source to a plurality of users. The multimedia data includes video information, audio information, or the like.

In recent years, technologies that allow people in remote places to communicate with each other as if they were in a same place, and that allows the people to work together have been gaining attention with development of information communication technologies. Such communication between the people in remote places is established by distributing a plurality of pieces of information such as video and audio to the plurality of places or the plurality of users.

In the case of distributing data such as video and audio to a plurality of users, a method of distributing multimedia data from a distribution source to a user who is requesting such data through unicast communication using IP packets or the like is used. The multimedia data is obtained by a video source such as a video camera or an audio source such as a microphone. The distribution source is storing the multimedia data.

Such unicast communication has a problem that, when the number of users who is requesting same data increases, a distribution server 91 replicates the data to numbers equal to the number of unicast communication channels corresponding to the number of users and distributes the replicated data, this may lead to a waste of network bandwidth, and therefore it may be impossible to distribute the data to the sufficient number of users (see FIG. 2). Alternatively, it is also possible to use a method in which a router 93 in a distribution route replicates data through multicast communication instead of the unicast communication to prevent the waste of the network bandwidth. However, when using this method, it is necessary for all routers 93 on the route to be compliant with the multicast communication, and therefore this method has not been widespread in the general public (see FIG. 3).

To solve the above-described problem, methods called application level multicast have been known. The application level multicast is a method of causing a user who is receiving distributed content to serve as a relay node and redistribute the content to another user, and multicasting content to many users by only using an application of the user (see FIG. 4).

With regard to such application level multicast, distribution performance of the whole system heavily depends on how distribution routes are constructed.

JP2007-235681A discloses a method and the like of measuring throughput or the like of distribution paths and switching distribution trees for performing distribution through the application level multicast in accordance with situations.

SUMMARY

In the case of distributing video information and audio information to many users through such application level multicast, some user watches video only and mutes audio, and some user does not have any tool for displaying video and therefore plays only the audio information. Therefore, sometimes different users want to receive distribution of different combinations of the video and the audio (see FIG. 5).

If all data including the video and audio is distributed along a distribution tree irrespective of demands from the users in such a case, for example, video information data is distributed to a user who is requesting only audio information, and this leads to a waste of network bandwidth. In addition, the application level multicast also includes a problem that a network with a certain quality may cause a situation in which data of unnecessary media occupies a network bandwidth and this causes distribution of video with low quality, or audio data is breaking up.

Therefore, it is desired to provide a communication device, a communication control device, and a data distribution system for reducing a waste of a network bandwidth by selectively transmitting media data of a type requested by each node, and constructing an efficient distribution tree with regard to the data distribution system that distributes multimedia data.

The present invention has been made to solve the above-described problems, and the present invention adopts the following configurations.

According to the first present invention, there is provided a communication device that constitutes a distribution tree of a data distribution system for distributing multimedia data and that is capable of redistributing the multimedia data received from a distribution source device or another communication device to one or more other communication devices serving as a child node, the communication device comprising: (1) a playback processing section configured to play and output corresponding media among the received multimedia data in accordance with playback media information indicating a media type designated by the own device; (2) a media information storage section configured to store the playback media information of the own device and media information including respective pieces of playback media information of the child node and a descendant node on a route where the own device exists in the distribution tree; (3) a media type control section configured to control a redistribution media type on a basis of the respective pieces of playback media information of the child node and the descendant node included in the media information when distributing the multimedia data to the child node; and (4) a redistribution section configured to redistribute, to the child node, media data selected from the multimedia data on a basis of the redistribution media type obtained by the media type control section.

According to the second present invention, there is provided a communication device of a distribution source that constitutes a distribution tree of a data distribution system for distributing multimedia data and that distributes the multimedia data, the communication device comprising: (1) a media information storage section configured to store media information including playback media information that is to be directly distributed along the distribution tree and that indicates respective media types requested to be played by one or more communication devices and respective pieces of playback media information of a child node and a descendant node on a route where each of the communication devices exists; (2) a media type control section configured to control a distribution media type on a basis of the playback media information of the respective communication devices and the respective pieces of playback media information of the child node and the descendant node that are included in the media information when distributing the multimedia data to the respective communication devices; and (3) a distribution section configured to distribute, to the respective communication devices, media data selected from the multimedia data on a basis of the distribution media type obtained by the media type control section.

According to the third present invention, there is provided a communication control device that controls communication between one or more distribution source devices each of which distributes multimedia data and communication devices each of which plays the multimedia data received from the distribution source device or another communication device and each of which is capable of redistributing the received multimedia data to one or more other communication devices, in a data distribution system including the distribution source device and the plurality of communication devices, the communication control device comprising: (1) a node information acquisition section configured to acquire node information of the distribution source device, and node information including playback media information indicating media types requested to be played by the respective communication devices; (2) a node information storage section configured to store the node information of the distribution source device and the node information of the respective communication devices; (3) a distribution configuration forming section configured to construct a distribution tree of the data distribution system corresponding to the media types requested to be played by the respective communication devices on a basis of the playback media information of the respective communication devices; and (4) a transmission section configured to transmit information related to distribution paths between respective nodes constituting the distribution tree, to the corresponding distribution device and the respective communication devices.

According to the fourth present invention, there is provided a data distribution system comprising: a distribution source device configured to distribute multimedia data; a plurality of communication devices, each of which is configured to play multimedia data received from the distribution source device or another communication device, and each of which is capable of redistributing the received multimedia data to one or more other communication devices; and a communication control device configured to control communication between the one or more distribution source devices and the communication devices, wherein the distribution source device is the communication device according to the second invention, a portion or all of the plurality of communication devices are the communication devices according to the first invention, the communication control device is the communication control device according to the third invention.

According to the present invention, the following effects can be attained.

The media type control sections of a communication device of a distribution source and a communication device on a reception side make it possible to selectively transmit media requested by child nodes and descendant nodes of the child nodes. This makes it possible to reduce a waste of a network bandwidth. The communication control device is capable of constructing a distribution tree in such a manner that a node capable of providing media of types requested by the respective communication devices on the reception side serves as a parent node, and this makes it possible to construct the efficient distribution tree. The network bandwidth having surplus makes it possible to maintain a high bit rate to be used for coding the video and the audio, and this makes it possible to distribute higher-quality video and higher-quality audio.

DETAILED DESCRIPTION OF THE EMBODIMENT(S)

(A) First Embodiment

Hereinafter, a first embodiment of a communication device, a communication control device, and a data distribution system according to the present invention will be described in detail with reference to drawings.

(A-1) Configuration According to First Embodiment
[Data Distribution System]

Figure 6:
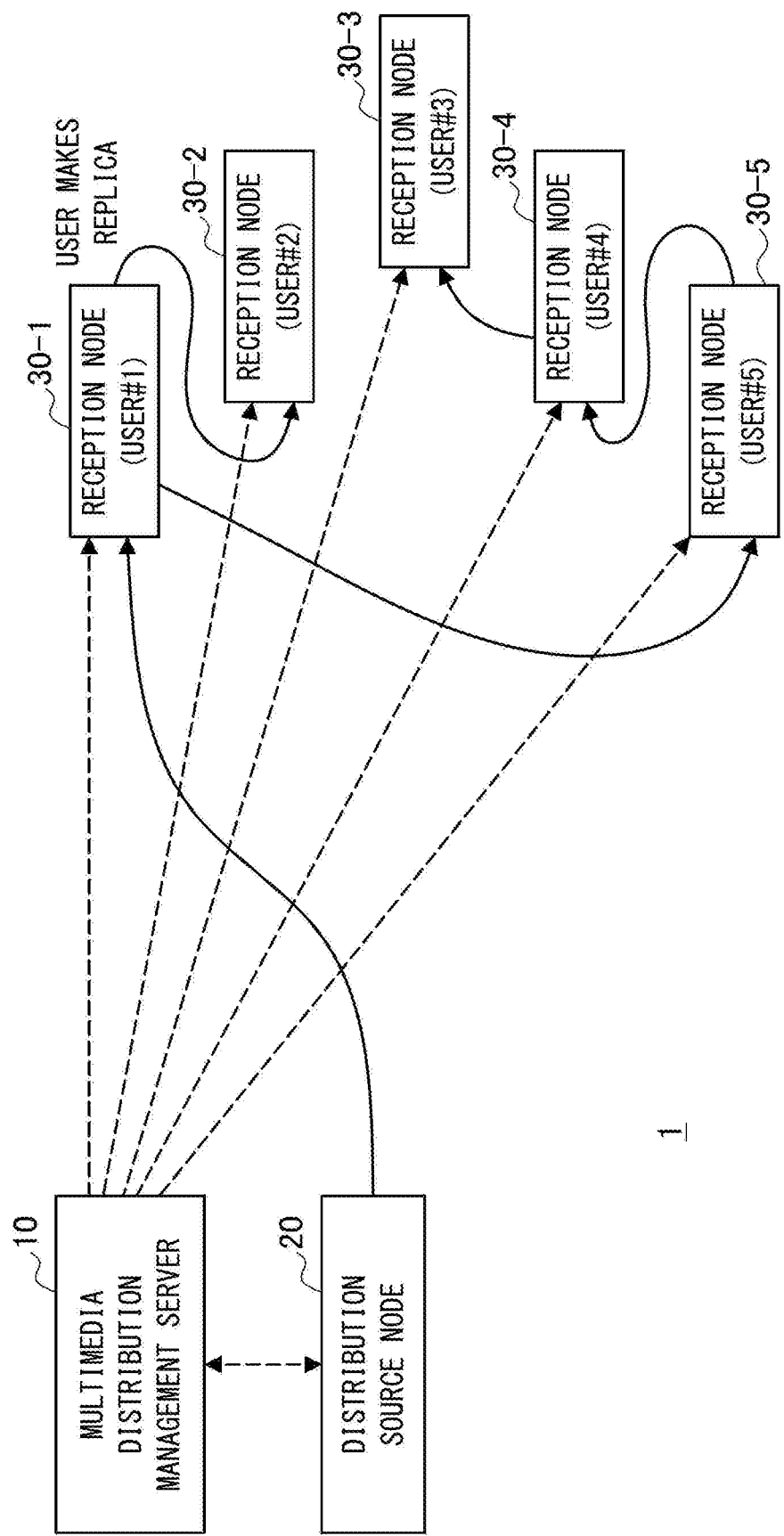
FIG. 6 is a block diagram illustrating an overall configuration (logical connection structure) of a data distribution system according to the first embodiment.

FIG. 6 is a block diagram illustrating an overall configuration (logical connection structure) of a data distribution system according to a first embodiment.

With reference to FIG. 6, a data distribution system 1 according to the present embodiment includes a multimedia distribution management server 10, a distribution source node 20, a plurality (for example, five in FIG. 6) of reception nodes 30 (30-1 to 30-5).

Note that, the numbers of respective structural elements included in the data distribution system 1 are not limited. For example, although FIG. 6 illustrates the single distribution source node 20, the data distribution system 1 may include a plurality of the distribution source nodes 20. In addition, the single distribution source node 20 may distribute a type of content (multimedia data) or may distribute a plurality of types of content (multimedia data).

The data distribution system 1 forms a tree-structured network, and distributes media data through application level multicast. The data distribution system 1 may distribute a plurality of pieces of multimedia data (content). In this case, distribution trees may be constructed for respective pieces of the multimedia data (content).

Note that, to simplify the description, the present embodiment assumes that the single distribution source node 20 distributes a type of multimedia data (content), and the plurality of reception nodes 30 request distribution of the multimedia data of the distribution source node 20.

Note that, in the tree-structured network, a flow of data from the distribution source node 20 to the reception nodes 30 side is downstream, and an opposite flow of data from the reception node 30 to the distribution source node 20 side is upstream. With regard to the distribution tree, a node (the distribution source node 20 or another reception node 30) that is on the upstream side relative to a certain reception node 30 and that directly communicate with the certain reception node 30 is referred to as a "parent node", and a node that is on the downstream side relative to the certain reception node 30 and that directly communicates with the certain reception node 30 is referred to as a "child node". In addition, with regard to the distribution tree, parent nodes that are on a further upstream side relative to a parent node of a certain node are collectively referred to as "ancestor nodes", and child nodes that are on a further downstream side relative to a child node of the certain node are collectively referred to as "descendant nodes".

With regard to the data distribution system 1, a means for connecting the respective structural elements (network configuration) is not limited. For example, the Internet, a wide area LAN, a wireless IP network, or the like is applicable.

The multimedia distribution management server 10 constructs a distribution tree for distributing multimedia data between the distribution source node and the respective reception nodes 30, and manages the structure of the distribution tree.

Note that, in the case where the data distribution system 1 is capable of distributing a plurality of pieces of multimedia data (content), the multimedia distribution management server 10 may construct and manage a distribution tree for each piece of the multimedia data on the basis of specific information for specifying respective pieces of the multimedia data. The distribution tree includes the distribution source node 20 and the respective reception nodes 30 that request distribution.

The distribution source node 20 is a device serving as a distribution source of data (hereinafter, also referred to as "distribution data") to be distributed to the respective reception nodes 30. In response to an instruction from the multimedia distribution management server 10, the distribution source node 20 transmits multimedia data to one or more reception nodes 30 serving as direct distribution destinations out of the plurality of reception nodes 30. Here, the distribution source node 20 transmits, to the respective reception nodes 30, multimedia data subjected to media type control processing in accordance with media information including media types acquired from the child nodes and the descendant nodes in the distribution tree.

Note that, contents and a form of distribution data are not limited. For example, content data including video, audio, and the like (such as data converted into a streaming format on the basis of video data in a file format), and multimedia data including real-time video data obtained from a video source such as a video camera, real-time audio data obtained from an audio source such as a microphone, and the like (multimedia information) are exemplified. In addition, for example, the distribution data may be a document, presentation data, or the like instead of the video data or the audio data. The distribution source node 20 distributes the distribution data to the reception nodes 30 in accordance with media types requested by the reception nodes 30.

In response to an instruction from the multimedia distribution management server 10, each reception node 30 sets a distribution path in the distribution tree, receives the multimedia data from another reception node 30 or the distribution source node 20 serving as its parent node, and plays and outputs media in accordance with playback media information including a media type to be played by its own node.

In addition, in response to an instruction from the multimedia distribution management server 10, each reception node 30 transmits (redistributes) the multimedia data to respective reception nodes 30 (in other words, child nodes) that treat the reception node 30 as a parent node. Here, the reception node 30 transmits (redistributes), to the respective reception nodes 30, multimedia data subjected to the media type control processing in accordance with media information including media types acquired from the child nodes and the descendant nodes of the reception node 30 in the distribution tree.

[Multimedia Distribution Management Server]

Figure 7:
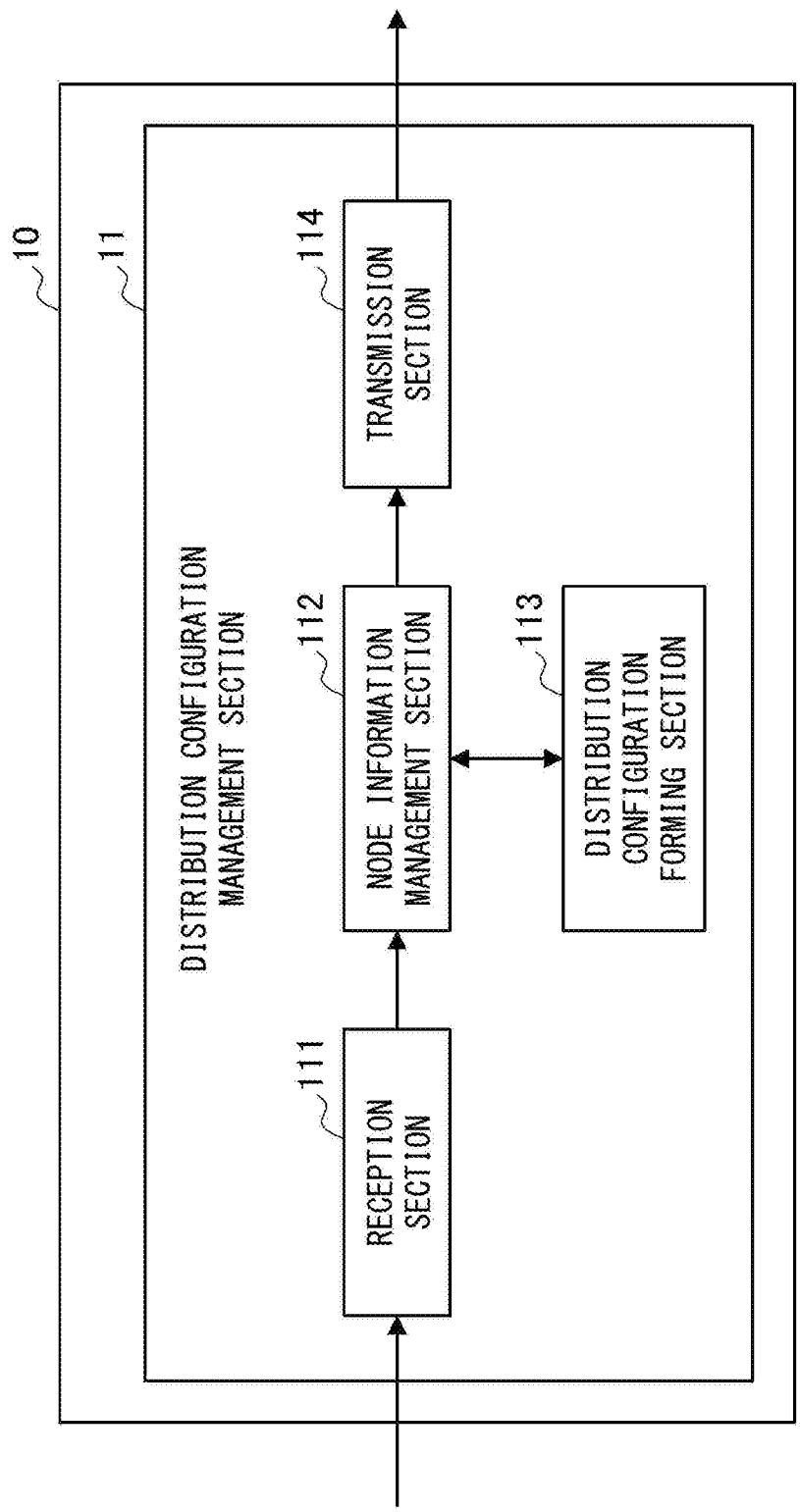
FIG. 7 is an internal configuration diagram illustrating an internal configuration of a multimedia distribution management server according to the first embodiment.

FIG. 7 is an internal configuration diagram illustrating an internal configuration of the multimedia distribution management server 10 according to the first embodiment.

In FIG. 7, the multimedia distribution management server 10 according to the first embodiment includes a distribution configuration management section 11. The distribution configuration management section 11 includes a reception section 111, a node information management section 112, a distribution configuration forming section 113, and a transmission section 114.

The multimedia distribution management server 10 may be configured by installing a program (for example, a communication control program or the like) into a computer such as a PC or a workstation, for example.

The distribution configuration management section 11 acquires node information including identification information (such as ID numbers or network addresses, for example) for identifying respective nodes from the distribution source node 20 and the respective reception nodes 30, and constructs a distribution tree for distributing multimedia data on the basis of the node information of the respective nodes. Next, information related to connection partners of distribution paths between nodes is transmitted to the distribution source node 20 and the respective reception nodes 30 (the distribution source node 20 and the respective reception nodes 30 are notified of the information) on the basis of the constructed distribution tree. This makes it possible for the distribution source node 20 and the respective reception nodes 30 to set communication paths to their parent nodes and communication paths to their child nodes, and transmit/receive distribution data via the respective communication paths.

The reception section 111 receives the node information from the distribution source node 20 and the respective reception nodes 30, and provides the received node information to the node information management section 112.

The node information management section 112 manages the received node information of the distribution source node 20 and the respective reception nodes 30. The node information management section 112 provides the node information of the distribution source node 20 and the respective reception nodes 30 to the distribution configuration forming section 113 for constructing a distribution tree.

In addition, the node information management section 112 derives information (communication paths) related to distribution paths on the basis of the constructed distribution tree, and causes the distribution source node 20 and the respective reception nodes 30 to transmit information related to the respective distribution paths. The information related to the distribution paths indicates transmission sources and transmission destinations of the distribution paths.

The distribution configuration forming section 113 constructs the distribution tree for distributing the multimedia data on the basis of the node information of the distribution source node 20 and the respective reception nodes 30. The node information may include identification information of the respective nodes, media information including the media types requested by the respective reception nodes 30, and the like. Because the media information is included in such a way, it is possible for the distribution configuration forming section 113 to construct the distribution tree in which a node capable of distributing media data of the media types requested by the respective reception nodes 30 serves as a parent node. As a result, it is possible to construct the efficient distribution tree.

The distribution configuration forming section 113 reconstructs a distribution tree in the case where a new reception node 30 participates in the network, in the case where a reception node 30 withdraws from the network, or in another case. When reconstructing the distribution tree, the node information management section 112 instructs the distribution source node 20 and the respective reception nodes 30 to reconstruct the distribution tree.

The transmission section 114 transmits the information related to the respective distribution paths acquired from the node information management section 112 to the distribution source node 20 and the respective reception nodes 30.

Note that, the data distribution system 1 illustrated in FIG. 6 may include a plurality of the distribution source nodes 20. In this case, the multimedia distribution management server 10 may construct and manage distribution trees for the respective distribution source nodes 20 (for respective pieces of multimedia content to be distributed, for example). For example, each of a plurality of users deploys the distribution source node 20 in his/her terminal, and deploys, in the same terminal, a plurality of reception nodes of distribution trees whose distribution sources are other users. Accordingly, communication may be established when multimedia data is bi-directionally distributed among the plurality of users.

[Distribution Source Node]

Figure 8:
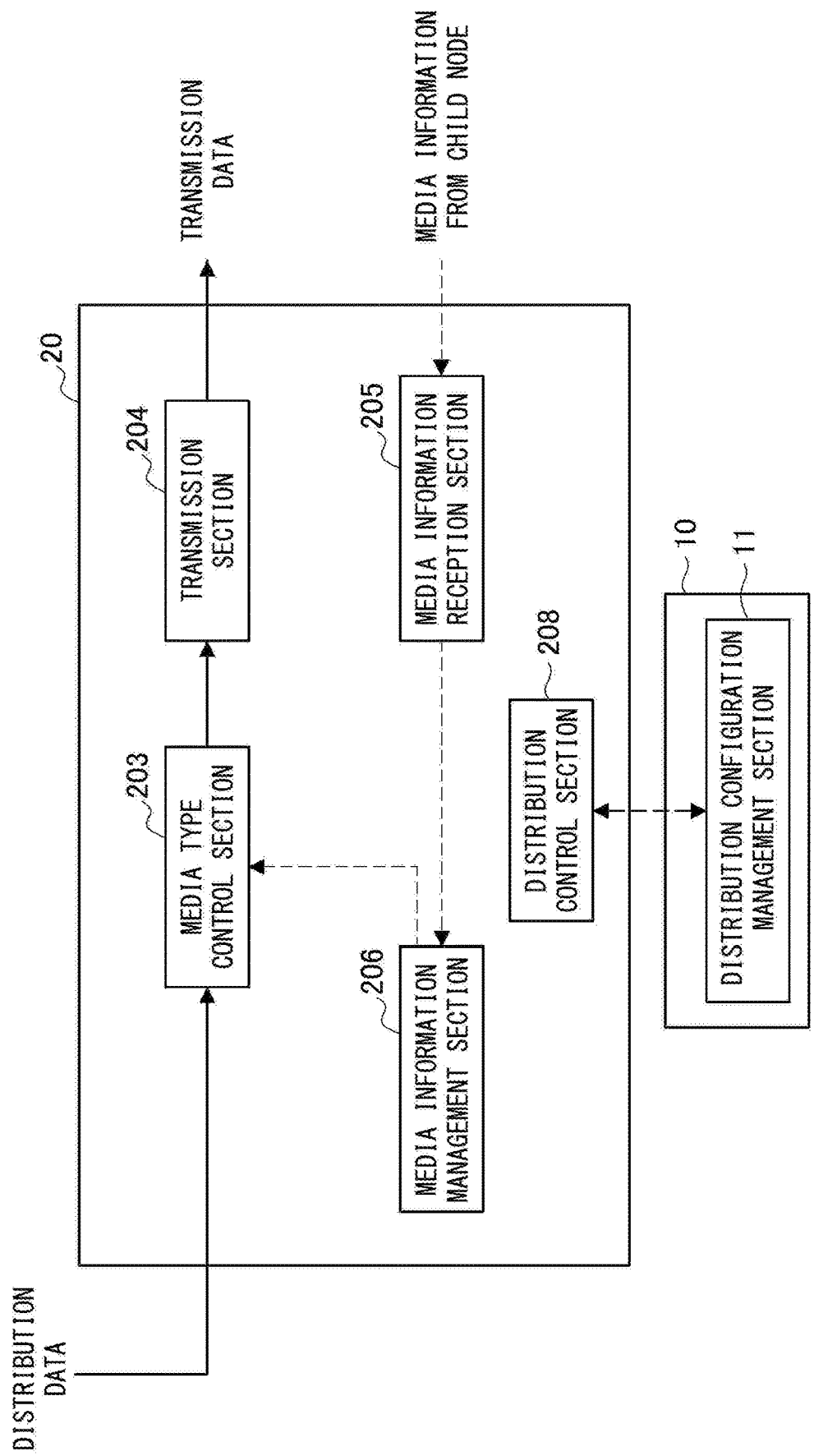
FIG. 8 is an internal configuration diagram illustrating an internal configuration of a distribution source node according to the first embodiment.

FIG. 8 is an internal configuration diagram illustrating an internal configuration of the distribution source node 20 according to the first embodiment.

In FIG. 8, the distribution source node 20 according to the first embodiment includes a media type control section 203, a transmission section 204, a media information reception section 205, a media information management section 206, and a distribution control section 208.

The distribution source node 20 may be configured by installing a program (for example, a distribution program or the like) into a computer such as a PC, a workstation, or a mobile terminal (for example, a terminal such as a smartphone or a tablet terminal), for example.

The distribution control section 208 acquires the information related to the respective distribution paths from the distribution configuration management section 11 with regard to the distribution tree constructed by the distribution configuration management section 11 of the multimedia distribution management server 10, and performs distribution control over the transmission section 204 and the media information reception section 205 on the basis of the information related to the distribution paths.

The media type control section 203 inputs multimedia data including video and audio to be distributed, and controls types of media data to be distributed to child nodes (reception nodes 30) that directly receives distribution from the distribution source node 20.

More specifically, the media type control section 203 acquires, from the media information management section 206 (to be described later), respective media types requested by one or more reception nodes 30 that establish direct communication in the distribution tree and the child nodes and the descendant nodes of the respective reception nodes 30 that establish direct communication, creates multimedia data including media data of the media types requested by the respective reception nodes 30 that establish direct communication and the child nodes and the descendant nodes of the reception nodes 30, and provides the created multimedia data to the transmission section 204. This makes it possible to distribute the multimedia data including media data of the media types requested by the respective reception nodes 30 that directly communicate with the distribution source node 20 and the child nodes and the descendant nodes of the respective reception nodes 30, to the respective reception nodes 30 that establish direct communication.

The transmission section 204 transmits (distributes), to the child nodes, the multimedia data whose media types are controlled by the media type control section 203.

The media information reception section 205 receives media information including playback media information requested to be played by the respective reception nodes 30 that establish direct communication and the child nodes and the descendant nodes of the respective reception nodes 30, from the one or more reception nodes 30 that directly communicate with the distribution source node 20 out of the reception nodes 30 constituting the distribution tree.

The media information management section 206 manages media information received by the media information reception section 205. For example, the media information management section 206 manages distribution data to be distributed in association with pieces of identification information of the respective reception nodes 30 and the media types requested by the respective reception nodes 30. In addition, the media information management section 206 manages the respective media types requested by the child nodes and the descendant nodes of the one or more reception nodes 30 that establish direct communication out of the reception nodes 30 constituting the distribution tree, with regard to the respective reception nodes 30.

[Reception Node 30]

Figure 1:
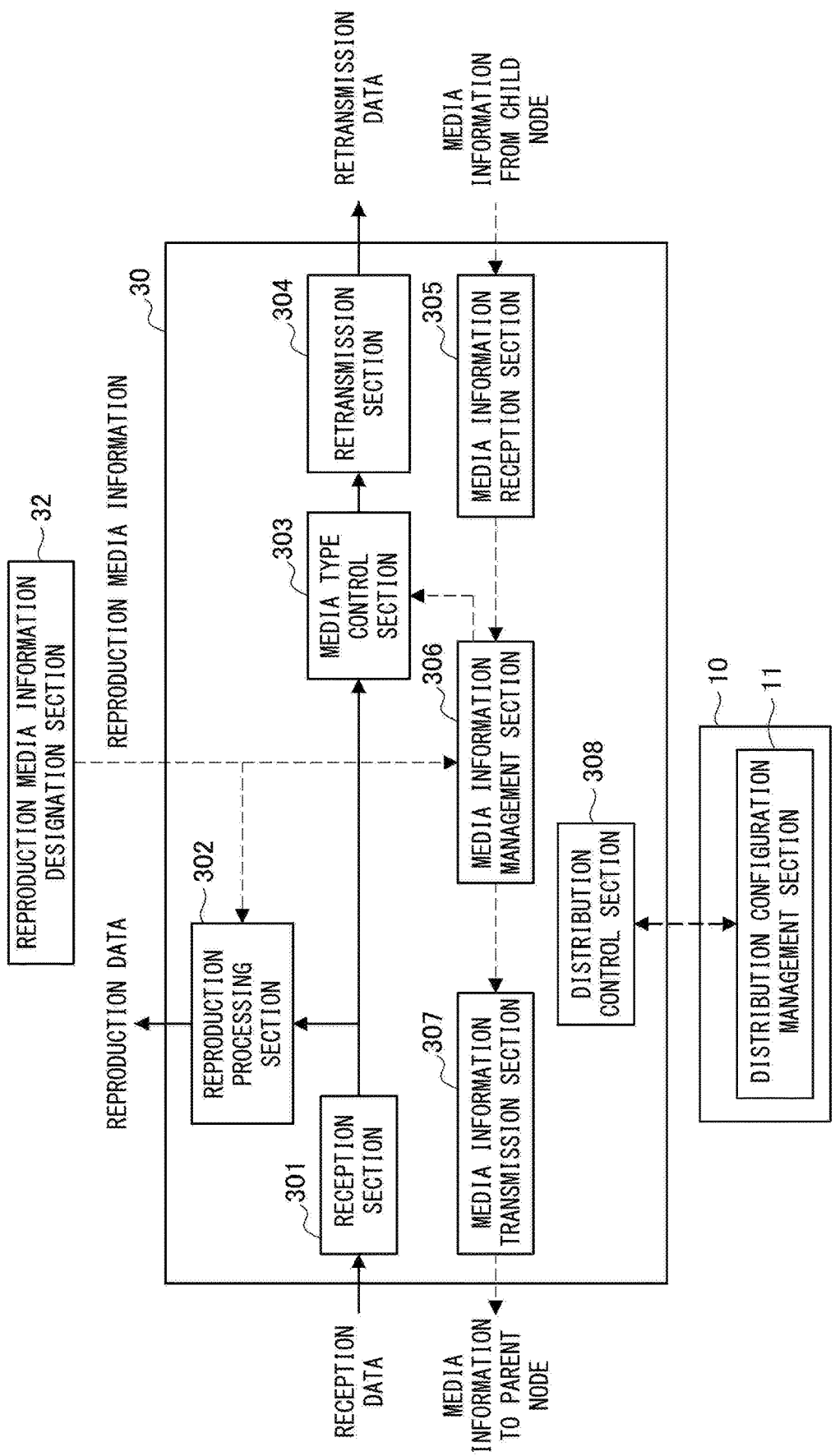
FIG. 1 is an internal configuration diagram illustrating an internal configuration of a reception node according to a first embodiment.
Figure 2:
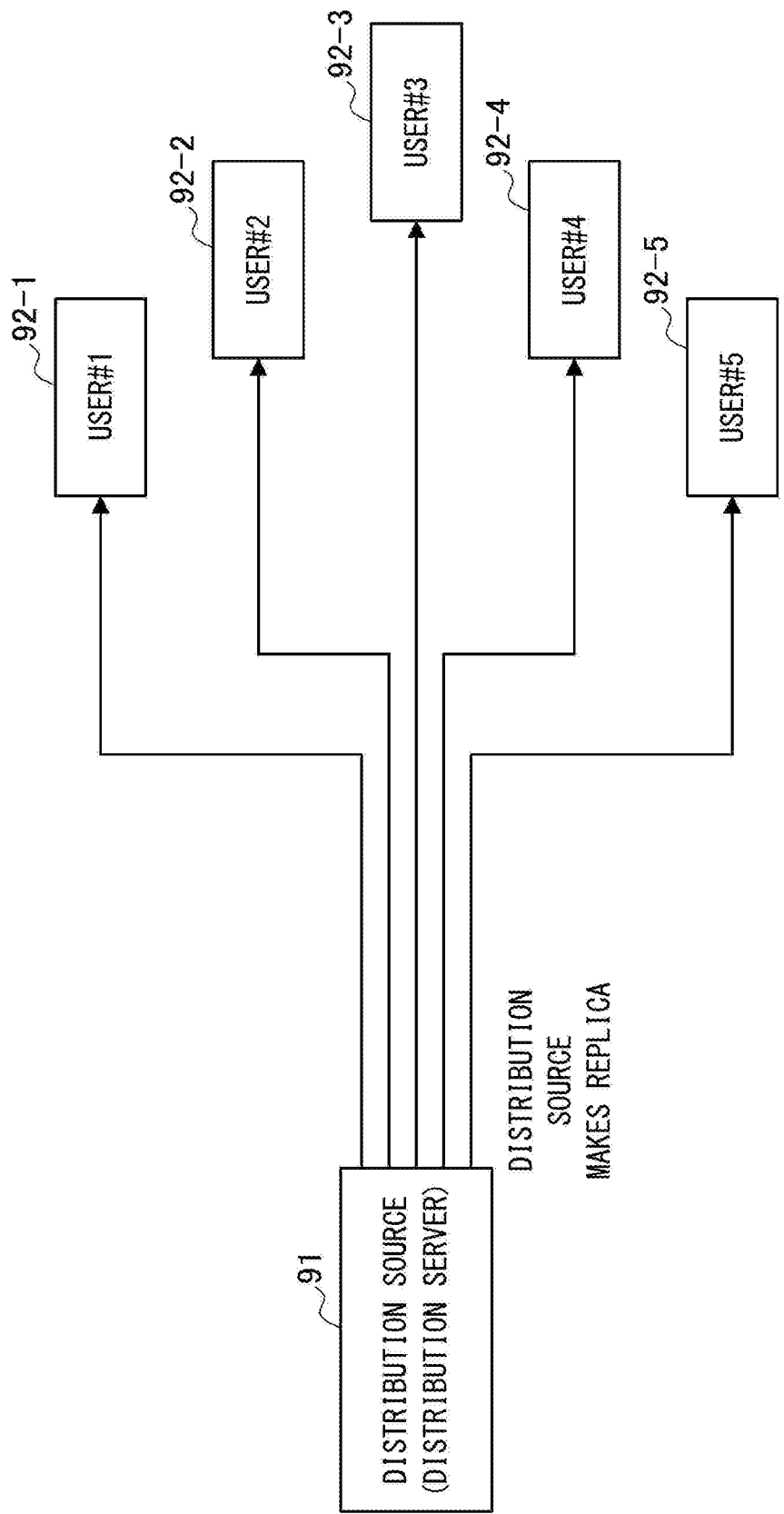
FIG. 2 is an explanatory diagram for describing an example of conventional data distribution through unicast.
Figure 3:
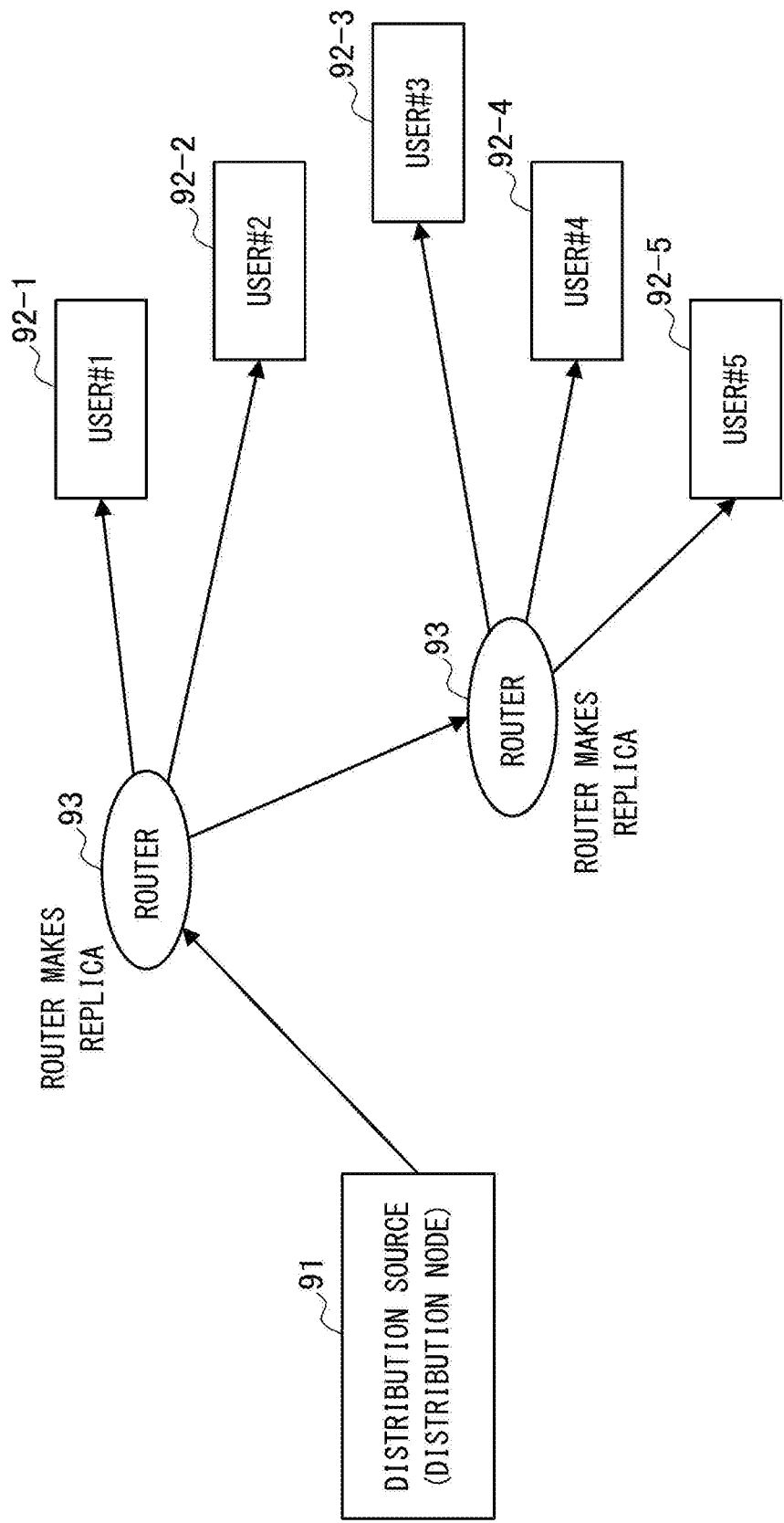
FIG. 3 is an explanatory diagram for describing an example of conventional data distribution through multicast.
Figure 4:
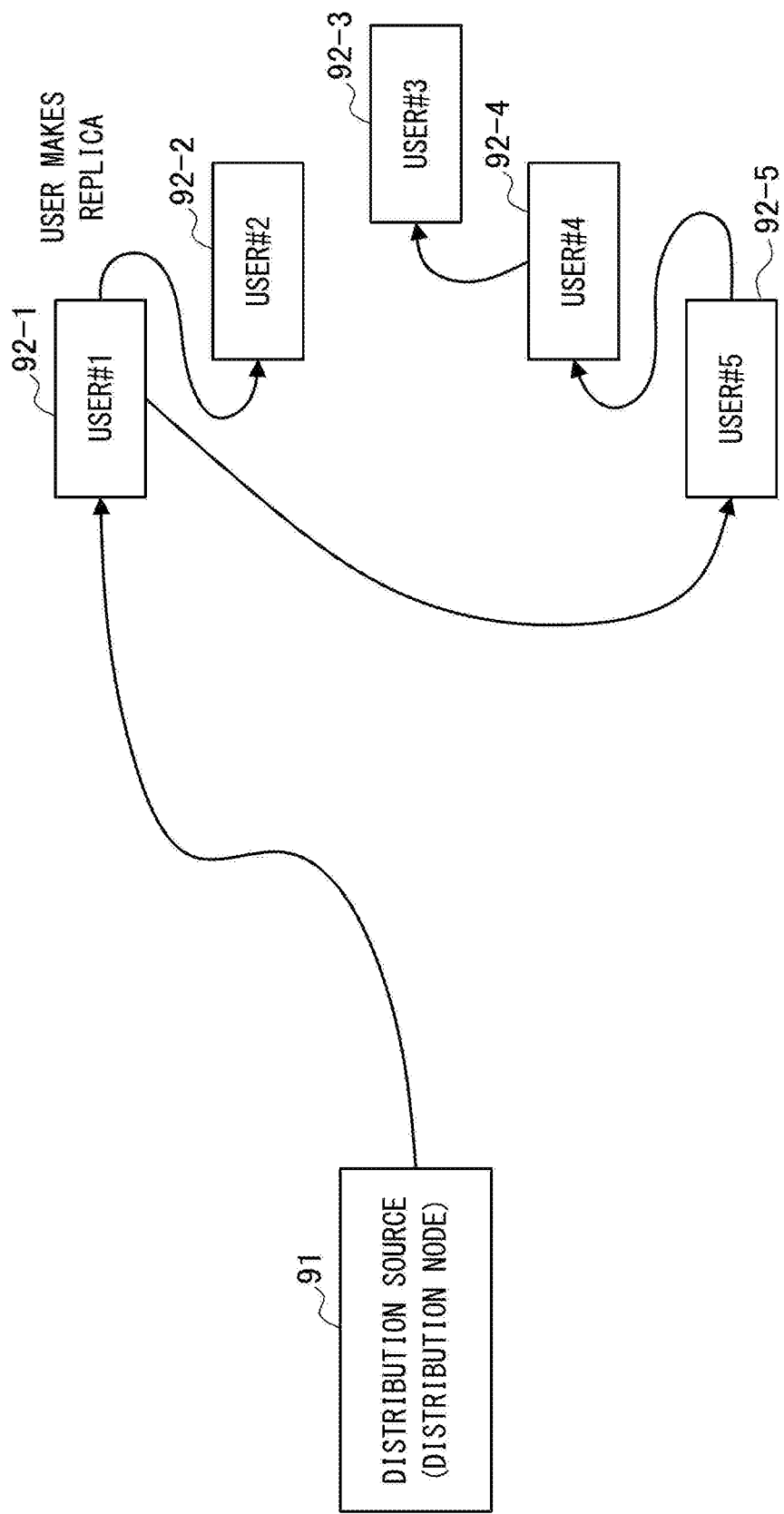
FIG. 4 is an explanatory diagram for describing an example of conventional data distribution through application level multicast.

FIG. 1 is an internal configuration diagram illustrating an internal configuration of the reception node 30 according to the first embodiment.

In FIG. 1, the reception node 30 according to the first embodiment includes a reception section 301, a playback processing section 302, a media type control section 303, a retransmission section 304, a media information reception section 305, a media information management section 306, a media information transmission section 307, and a distribution control section 308.

The reception node 30 may be configured by installing a program (for example, a distribution program or the like) into a computer such as a PC, a workstation, or a mobile terminal (for example, a terminal such as a smartphone or a tablet terminal), for example.

The distribution control section 308 acquires the information related to the respective distribution paths from the distribution configuration management section 11 with regard to the distribution tree constructed by the distribution configuration management section 11 of the multimedia distribution management server 10, and performs distribution control over the reception section 301, the retransmission section 304, the media information reception section 305, and the media information transmission section 307 on the basis of the information related to the distribution paths.

For example, the reception section 301 receives distribution data from the parent node that is another reception node 30 or the distribution source node 20, and provides the received distribution data to the playback processing section 302 and the media type control section 303.

The playback processing section 302 plays media out of the received distribution data in accordance with playback media information of its own node indicated by a user, and outputs the played data (playback data).

More specifically, for example, the user designates a playback media type with regard to the own node by using the playback media information designation section 32, and playback media information including the playback media type is input to the playback processing section 302. Next, the playback processing section 302 plays the media designated by the user on the basis of the input playback media information. For example, in the case where the distribution data distributed by the distribution source node 20 is the multimedia data including video and audio and the user has designated the video and the audio as the playback media information, the playback processing section 302 plays the video and the audio on the basis of the received multimedia data. It is possible for the user to designate the media type to be played by the own node. The user is also capable of designate only one of the video and the audio as the media type. In this case, the playback processing section 302 plays the video or the audio alone.

In the case where the own node is a relay node that redistributes data to the child nodes (other reception nodes 30), the media type control section 303 controls media types in such a manner that the media types are suitable for distribution to the child nodes. In other words, when distributing distribution data to child nodes and descendant nodes of the own node in the case where the own node is the parent node, the media type control section 303 creates redistribution multimedia data in accordance with media types requested to be played by the child nodes and the descendant nodes, and provides the created multimedia data to the retransmission section 304.

More specifically, the media type control section 303 acquires, from the media information management section 306 (to be described later), respective media types requested by the child node and the descendant node of the own node, creates multimedia data including media data of the media types requested by the child node and the descendant node, and provides the created multimedia data to the retransmission section 304. This makes it possible to redistribute the multimedia data including media data of the media types requested by the child node and the descendant node of the own node, to the child node.

The retransmission section 304 distributes, to the child node, the redistribution multimedia data whose media types are controlled by the media type control section 303.

The media information reception section 305 receives media information form the child node in the distribution tree. The media information includes playback media information (media types) of the child node and descendant nodes of the child node (other reception nodes 30 that are on a downstream side relative to the child node in the distribution tree). In the first embodiment, the media information received from the child node includes information in which playback media information (media information) requested to be played by the child node is integrated with playback media information (media information) requested to be played by further child nodes (descendant nodes) of the child node.

The media information management section 306 manages playback media information including a media type to be played by its own node designated by the user via the playback media information designation section 32, for example, and media information of the child nodes and the descendant nodes received by the media information reception section 305 (that is, media types requested to be played by the child nodes and the descendant nodes). The media information management section 306 provides the playback media information (the media types) of the child nodes and the descendant nodes to the media type control section 303.

The media information transmission section 307 refers to the media information held by the media information management section 306, and transmits media information including the playback media information of its own node and the playback media information of the child nodes and the descendant nodes to the parent node (such as the distribution source node 20 or another reception node 30) as media information to the parent node.

(A-2) Operation according to First Embodiment

Next, operation of a data distribution method performed by the data distribution system 1 according to the first embodiment will be described.

(A-2-1) Overall Operation of Data Distribution Method

As illustrated in FIG. 6, the distribution source node 20 distributes multimedia data to one or more reception nodes 30 through the application level multicast. The distribution source node 20 is a distribution source of the multimedia data to be distributed, and the reception nodes 30 are receivers of the multimedia data.

The multimedia distribution management server 10 manages a state of the structure of the distribution tree that is distribution routes of multimedia data. The multimedia distribution management server 10 exchanges node information related to respective node and information related to the structure of the distribution tree with the distribution source node 20 and the reception nodes 30, and reconstructs a distribution tree in response to dynamic addition or withdrawal of a node.

Any method can be used for signaling or the like to set specific contents of the information related to the structure of the distribution tree and communication channels serving as specific distribution paths. For example, the multimedia distribution management server 10 may be configured to also serve as a signaling server that relays signaling for setting communication channels between the nodes. In addition, for example, the multimedia distribution management server 10 may also serve as a signaling server for setting communication channels for exchanging the media information including the media types between the reception nodes 30 and the distribution source node 20. In addition, for example, the multimedia distribution management server 10 may be configured in such a manner that the media information (related to the media types) is not directly exchanged between the nodes but the multimedia distribution management server 10 also functions to relay exchange of the media information between the nodes.

First, the distribution source node 20 inputs distribution data that is the multimedia data to be distributed, and notifies the multimedia data distribution management server 10 of node information of the distribution source node.

The reception node 30 notifies the multimedia distribution management server 10 of node information of the reception node. For example, the node information of the reception node includes information for specifying multimedia data that the reception node 30 wants to receive or the like.

The node information may include identification information of the distribution source node 20 or the reception node 30, information related to a media type that the distribution source node 20 is capable of distribute, information related to a media type requested to be played by the reception node 30, or the like.

The distribution configuration management section 11 of the multimedia distribution management server 10 constructs the structure of the distribution tree including the distribution source node 20 and the one or more reception nodes 30. Here, the distribution configuration management section 11 constructs the distribution tree on the basis of node information, the information related to media types, and the like received from the distribution source node 20 and the respective reception nodes 30. Next, the distribution configuration management section 11 of the multimedia distribution management server 10 notifies each of the nodes (the distribution source node 20 and the reception nodes 30) of information related to a distribution path including a connection partner of the distribution path.

Each of the distribution source node 20 and the reception nodes 30 sets a communication channel to its parent node for receiving distribution data and a communication channel to its child nodes for transmitting the distribution data on the basis of the information related to the distribution path acquired from the distribution configuration management section 11, and transmits/receives the distribution data.

Each of the distribution source node 20 and the reception nodes 30 secures a communication channel to its connection partner in accordance with a distribution path.

The distribution source node 20 controls the media type of the multimedia data held by its own node on the basis of the media information including the media types requested by the plurality of reception nodes 30, creates multimedia data including media data of the media types requested by the respective reception nodes 30, and transmits the created multimedia data.

When the reception node 30 receives the distribution data from its parent node, the reception node 30 plays the media of the media type to be played by its own node on the basis of the distribution data. In addition, in the case where the reception node 30 has its child node and/or its descendant node, the reception node 30 controls the media type on the basis of the media information including the media types requested to be played by the child node and/or the descendant node on the basis of the received distribution data, creates multimedia data including media data of the media types requested by the child node and/or the descendant node, and retransmits the created multimedia to the child node.

In the case where a new reception node 30 participates in the distribution tree, the multimedia distribution management server 10 allocates a parent node (the distribution source node 20 or the reception node 30 that has already received distribution) serving as a distribution source on the basis of node information reported by the new reception node 30. Subsequently, a distribution tree is constructed (reconstructed) when the allocated parent node starts distribution to the new reception node 30.

In the case where one of the reception nodes 30 participating in the distribution tree withdraws from the distribution tree, distribution to reception nodes 30 whose parent node (or ancestor node) is the withdrawn node will be stopped.

Therefore, new parent nodes are allocated to the reception nodes 30 for which distribution is stopped. The multimedia distribution management server 10 may reallocate the parent nodes to only direct child nodes of the withdrawn node, or may reallocate the parent nodes to descendant nodes of the child nodes in addition to the direct child nodes. The multimedia distribution management server 10 reconstructs the distribution tree by reallocating the parent nodes to such reception nodes 30.

(A-2-2) Operation of Distribution Source Node)

As illustrated in FIG. 8, distribution data that is multimedia data to be distributed is input to the distribution source node 20. At this time, the distribution source node 20 does not transmits the multimedia data that is the distribution data as it is, but transmits the multimedia data after performing media type control processing in accordance with the media information that is reported by the child node and that includes media types requested by the child node and the descendant node.

[Media Information Transmission/Reception Processing]

The media information reception section 205 of the distribution source node 20 receives the media information transmitted from the child node. Here, the media information received from the child node may be information including all media types requested to be played by the child node and other reception nodes 30 (that is, descendant nodes) that are on a downstream side relative to the child node in the distribution tree.

The media information received by the media information reception section 205 is supplied to the media information management section 206. The media type control section 203 manages information in which pieces of identification information of the respective reception nodes 30 are associated with the media types to recognize the media types requested to be played by the respective reception nodes 30 with regard to multimedia data to be distributed.

[Multimedia Data Distribution Processing]

The media type control section 203 performs media type control processing on the multimedia data that is the input distribution data to distribute the multimedia data to the child node (the reception node 30) that directly receives distribution from the distribution source node 20. Specifically, the media type control section 203 performs processes of selecting only media data of a media type requested by the child node from the input multimedia data and generating distribution multimedia data or the like.

For example, when the distribution source node 20 distributes the distribution data, information held by the media information management section 206 is supplied to the media type control section 203, and the media type control section 203 generates multimedia data including media data of the media types requested to be played by the child nodes and the descendant node.

The transmission section 204 transmits a piece of the multimedia data obtained from the media type control section 203 to each of the child nodes.

(A-2-3) Operation of Reception Node
[Playback Media Information Designation Processing in Own Node]

As illustrated in FIG. 1, playback media information is input to the reception node 30. The playback media information indicates a media type that is to be played by the own node.

Figure 5A:
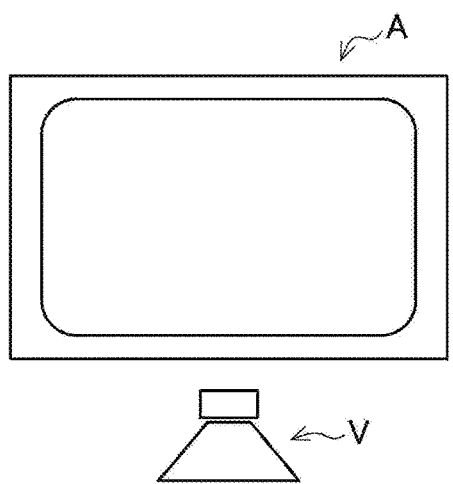
FIG. 5A is an explanatory diagram for describing an example of a media type requested by each conventional node.
Figure 5B:
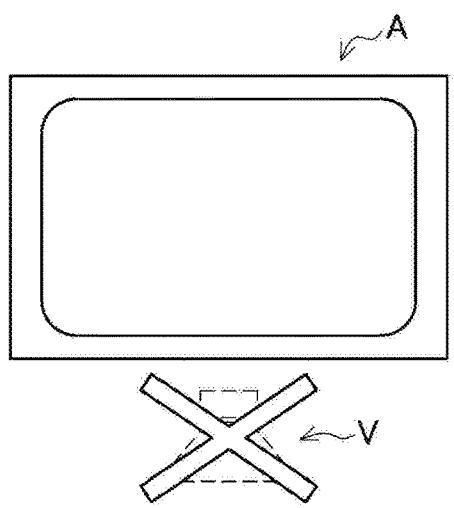
FIG. 5B is an explanatory diagram for describing an example of a media type requested by each conventional node.
Figure 5C:
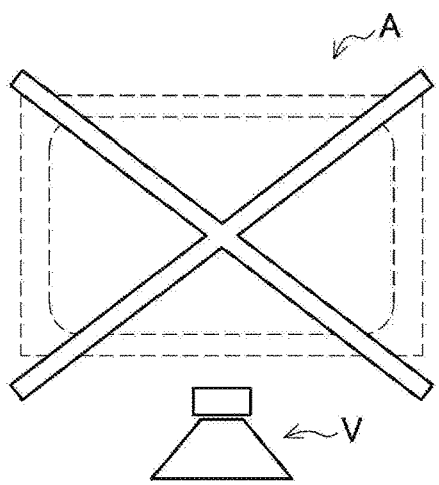
FIG. 5C is an explanatory diagram for describing an example of a media type requested by each conventional node.

For example, the playback media information may be designated by the user via the playback media information designation section 32. The playback media information including a media type designated by the user via the playback media information designation section 32 is input to the playback processing section 302 and the media information management section 306. As illustrated in FIG. 5, the playback media information is information related to a combination of media types to be played by the own node such as a media type indicating playback of both video and audio (see FIG. 5A), a media type indicating playback of video only (see FIG. 5B), and a media type indicating playback of audio only (see FIG. 5C), for example.

[Media Playback Processing]

The reception section 301 of the reception node 30 receives the multimedia data from its parent node (the distribution source node 20 or another reception node 30) that is a direct distribution source of the multimedia data.

The playback processing section 302 plays media of a media type corresponding to the input playback media information with regard to the received multimedia data. For example, in the case of video, a display section such as a display displays the video to be played among pieces of the multimedia data. In the case of audio, a speaker or the like outputs the audio to be played among the pieces of the multimedia data.

[Media Information Transmission/Reception Processing]

The media information reception section 305 of the reception node 30 receives the media information transmitted from the child node. Here, the media information received from the child node includes playback media information of the child node and playback media information of other reception nodes 30 (that is, descendant nodes) that are on a downstream side relative to the child node in the distribution tree.

The media information received by the media information reception section 305 is supplied to the media information management section 306. In addition, playback media information including a media type requested to be played by its own node is input to the media information management section 306.

Therefore, the media information management section 306 manages the playback media information of its own node and respective pieces of media information of the child node and the other reception nodes 30 serving as the descendant nodes among the distributed multimedia data. More specifically, the media information management section 306 may manage information in which pieces of identification information of the respective nodes are associated with the media types.

Next, in the case where the own node functions as a relay node that redistributes the multimedia data to the other reception nodes 30 as described later, the media information management section 306 supplies the media type control section 303 with the information in which pieces of identification information of the child node and the descendant nodes are associated with the media types to provide information necessary for the media type control section 303 to control the media types.

In addition, the media information management section 306 supplies the media information to the media information transmission section 307 to notify its parent node (the distribution source node 20 or another reception node 30) of the playback media information of its own node and media information including playback media information obtained from the child node and the descendant nodes.

Next, the media information transmission section 307 notifies the parent node of media information in which the playback media information of its own node is integrated with the media information including playback media information of the child node and the descendant nodes. In other words, the media information reported from the media information transmission section 307 to the parent node includes the playback media information of its own node and the playback media information of the child node and the descendant nodes. When integrating the pieces of media information, all the media types requested by any of the own node, the child nodes, and the descendant nodes are treated as media information to the parent node. In other words, the media information to the parent node includes not only the media type requested by the own node but also all the media types requested by all the child nodes and the descendant nodes existing in the route where the own node exits in the distribution tree.

[Multimedia Data Redistribution Processing]

In the case where a reception node 30 is a relay node that redistributes data to child nodes (other reception nodes 30), the media type control section 303 controls types of media to be distributed to the child nodes in accordance with the media information including the playback media information of the child nodes and the descendant nodes held by the media information management section 306. Next, the retransmission section 304 transmits the multimedia data obtained by the media type control section 303 to the respective child nodes.

In the case where there is no child node, the media type control processing and the retransmission processing are not performed.

In addition, the reception node 30 may be configured in such a manner that the media type control section 303 is omitted. In this case, the media types of the multimedia data received by the reception section 301 remain as they are, and the retransmission section 304 retransmits media data including media data of all the media types that have been received. Here, it is possible to determine whether to include or omit the media type control section 303 for each reception node 30, or it is also possible to dynamically determine whether to omit the processing from a single reception node 30 on the basis of its processing load or the like.

In other words, a plurality of reception nodes 30 existing in a certain route in the distribution tree may include both a reception node 30 whose media type control section 303 is disabled and a reception node 30 whose media type control section 303 is workable. Even in the case where a route of the distribution tree includes a plurality of the reception nodes 30 whose media type control section 303 is workable, the media type control section 303 of a reception node 30 with a heavy processing load related to the media type control may be dynamically disabled in response to a determination made by its own node, the multimedia distribution management server 10, or the like.

(A-2-4) Description of Media Information Exchanged Between Respective Nodes

Figure 9:
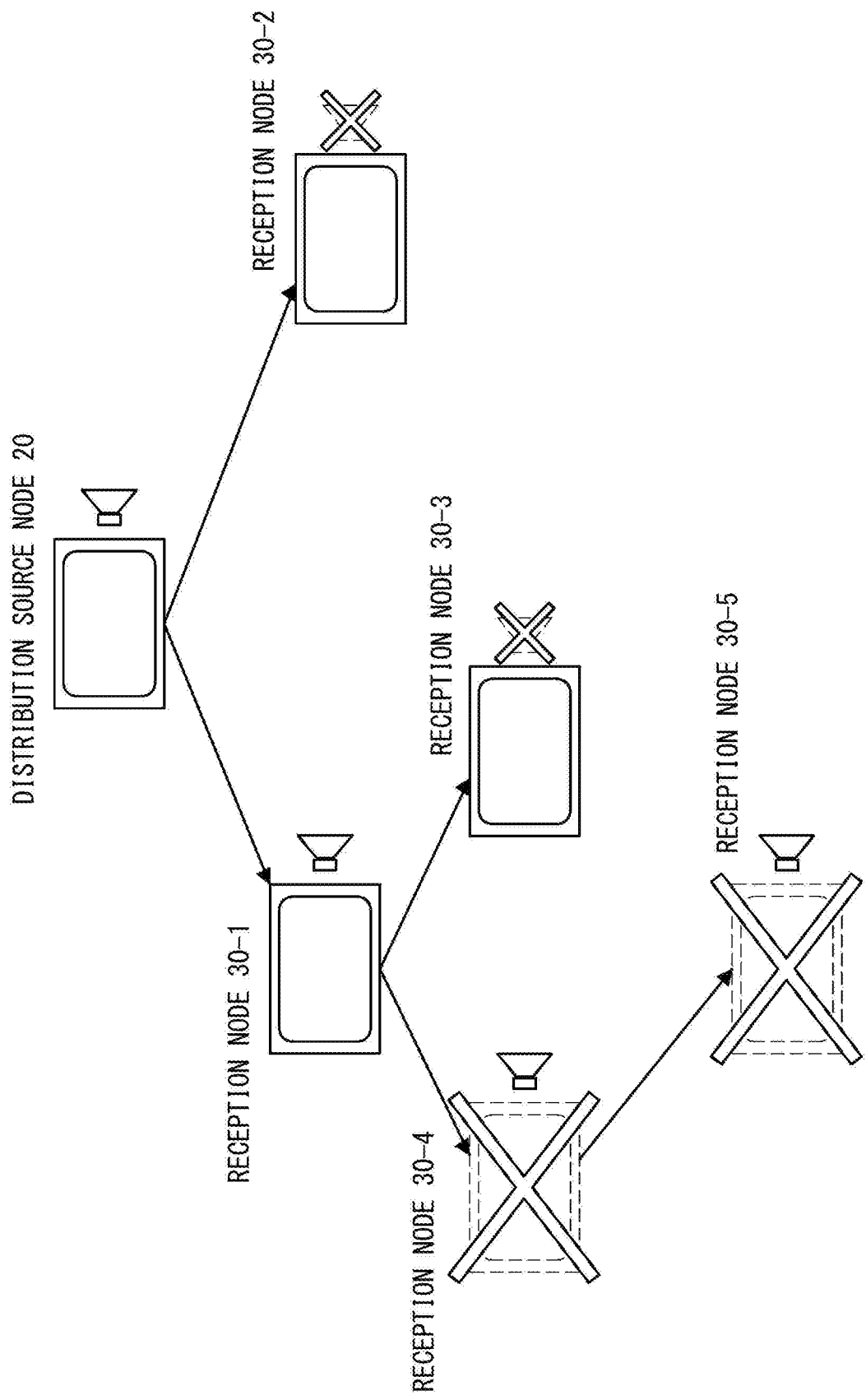
FIG. 9 is an explanatory diagram for describing media types requested to be played by respective nodes in the data distribution system according to the first embodiment.

FIG. 9 is an explanatory diagram for describing media types requested to be played by respective nodes in the data distribution system 1 according to the first embodiment.

Figure 10:
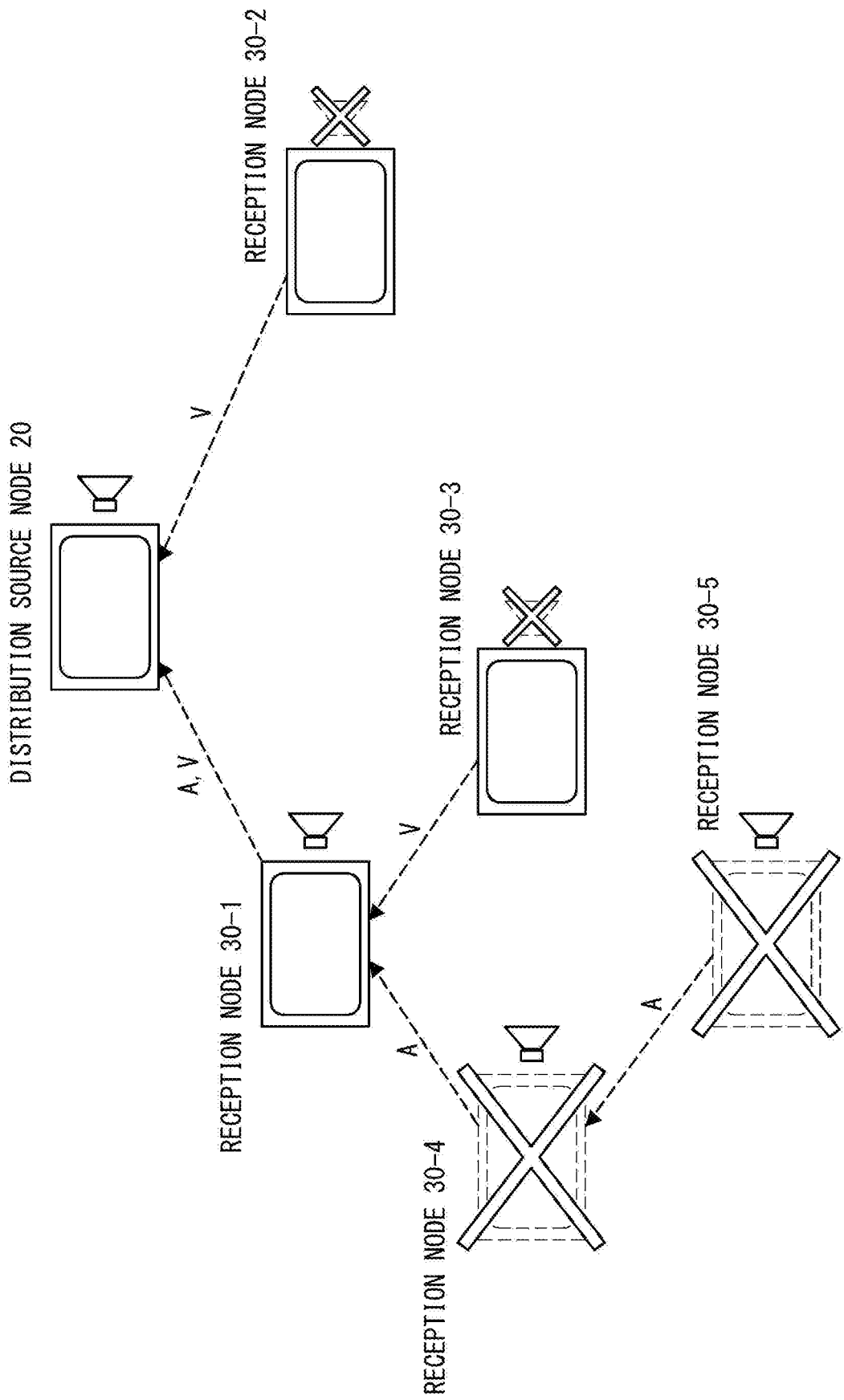
FIG. 10 is an explanatory diagram for describing states of media information exchanged between a distribution source node and reception nodes according to the first embodiment.

FIG. 10 is an explanatory diagram for describing states of media information exchanged between the distribution source node 20 and reception nodes 30 according to the first embodiment.

As illustrated in FIG. 9, playback media information indicating a media type that is to be played by a reception node 30 is provided to each reception node 30 that is a user who will receive multimedia distributed by the distribution source (distribution source node 20). For example, the playback media information is media type information indicating video only, audio only, or both video and audio, for example.

As illustrated in FIG. 10, each reception node 30 integrates media information reported by its child nodes with playback media information of its own node and notifies its parent node of the integrated information as media information.

In other words, the media information to the parent node is media types including all media requested by the own node, the child nodes, and the descendant nodes. In FIG. 10, "V" represents media information indicating video only, "A" represents media information indicating audio only, and "A, V" represents media information indicating both video and audio.

The playback media of the reception nodes 30 existing in a route are sequentially integrated and propagated to the parent node, and the distribution source node 20 is notified of the above-described media information.

Next, with reference to FIG. 9 and FIG. 10, the states of media type control will be described with regard to the respective nodes (distribution source node 20 and reception nodes 30).

As illustrated in FIG. 10, each of the nodes (distribution source node 20 and reception nodes 30) is notified of media information from its child nodes. The media information is obtained by integrating pieces of playback media information of the child nodes and descendant nodes of the child nodes (other reception nodes 30 that are on a downstream side relative to the child node in the distribution tree). In other words, each node is notified of the media information including all media to be played by its child nodes and any other reception nodes 30 below the child nodes.

The media type control section 203 or the media type control section 303 of each node (distribution source node 20 or reception node 30) selects only media of media types indicated by the media information from the child nodes from among input multimedia data, and transmits the selected media to its child nodes as illustrated in FIG. 9.

The case of omitting the media type control section 303 from the reception node 30 has been described above. In this case, sometimes media that is not requested may be transmitted to the nodes below the child nodes, but sometimes this may reduce processing load on the reception node 30.

When the multimedia distribution management server 10 is configured to relay media information between respective nodes as described above, it is possible for the multimedia distribution management server 10 to recognize which playback media each node included in the distribution tree is requesting. In addition, the multimedia distribution management server 10 may be configured in such a manner that a media type that the distribution source node 20 is capable of providing and playback media information of the reception node 30 itself are reported as pieces of node information reported by the distribution source node 20 or the reception node 30 when newly participating in the distribution tree, and thereby the multimedia distribution management server 10 recognizes a media type requested by each node.

When the distribution tree is reconstructed by participation of a new reception node or withdrawal of a reception node, the multimedia distribution management server 10 is capable of selecting a parent node serving as a distribution source only from among nodes capable of providing all types of media requested by nodes below child nodes. Note that, in the case where distribution data input to the distribution source node 20 does not include all the media, the selection may be made regardless of a possibility of provision of media that is not included in the distribution data. In other words, for example, in the case where only video is input to the distribution source node 20 but the reception node 30 requests both video and audio, it is possible to make a selection regardless of a possibility of provision of audio (this corresponds to provision of silent video).

In addition, for example, the multimedia distribution management server 10 may be configured to dynamically update the structure of the distribution tree in accordance with a state of a network of a distribution path reported by each node or the like, for example. At this time, the multimedia distribution management server 10 may be configured to update the structure of the distribution tree also in view of media information requested by the respective nodes. In other words, in the case where a child node or a descendant node requests media that is not played by a parent node from the parent node, wasteful transmission/reception of the media that is not requested by the parent node is necessary. Therefore, the multimedia distribution management server 10 may be configured to dynamically update the structure of the distribution tree in such a manner that the number of such nodes is reduced.

The above-described processing makes it possible to distribute the multimedia data through the application level multicast.

(A-3) Effects of First Embodiment

As described above, the first embodiment achieves the following effects.

In the multimedia data distribution system using the application level multicast, the media type control sections of the distribution source node and the reception nodes make it possible to selectively transmit media requested by only the child nodes and the descendant nodes of the child nodes. This makes it possible to reduce a waste of a network bandwidth.

The multimedia distribution management server is capable of constructing a distribution tree in such a manner that a node capable of providing media of types requested by the respective reception nodes serves as a parent node, and this makes it possible to construct the efficient distribution tree.

In addition, the network bandwidth having surplus makes it possible to maintain a high bit rate to be used for coding the video and the audio, and this makes it possible to distribute higher-quality video and higher-quality audio.

(B) Second Embodiment

Next, a second embodiment of a communication device, a communication control device, and a data distribution system according to the present invention will be described in detail with reference to drawings.

(B-1) Configuration and Operation According to Second Embodiment

With regard to the second embodiment, a case where the data distribution system 1 includes reception nodes from which at least the media type control section 303 is omitted, or a case where at least the media type control section 303 is omitted from one or more reception nodes among the plurality of reception nodes 303 included in the data distribution system 1, will be described.

In other words, cases where at least the media type control section 303 is omitted from all the reception nodes included in the data distribution system 1 or one or more reception nodes among the plurality of reception nodes included in the data distribution system 1, will be exemplified. That is, at least the media type control section 303 may be omitted from all the reception nodes constituting the data distribution system 1, or the data distribution system 1 may include both the reception node 30 described above according to the first embodiment, and a reception node 30A according to the second embodiment (to be described later).

[Reception Node]

Figure 11:
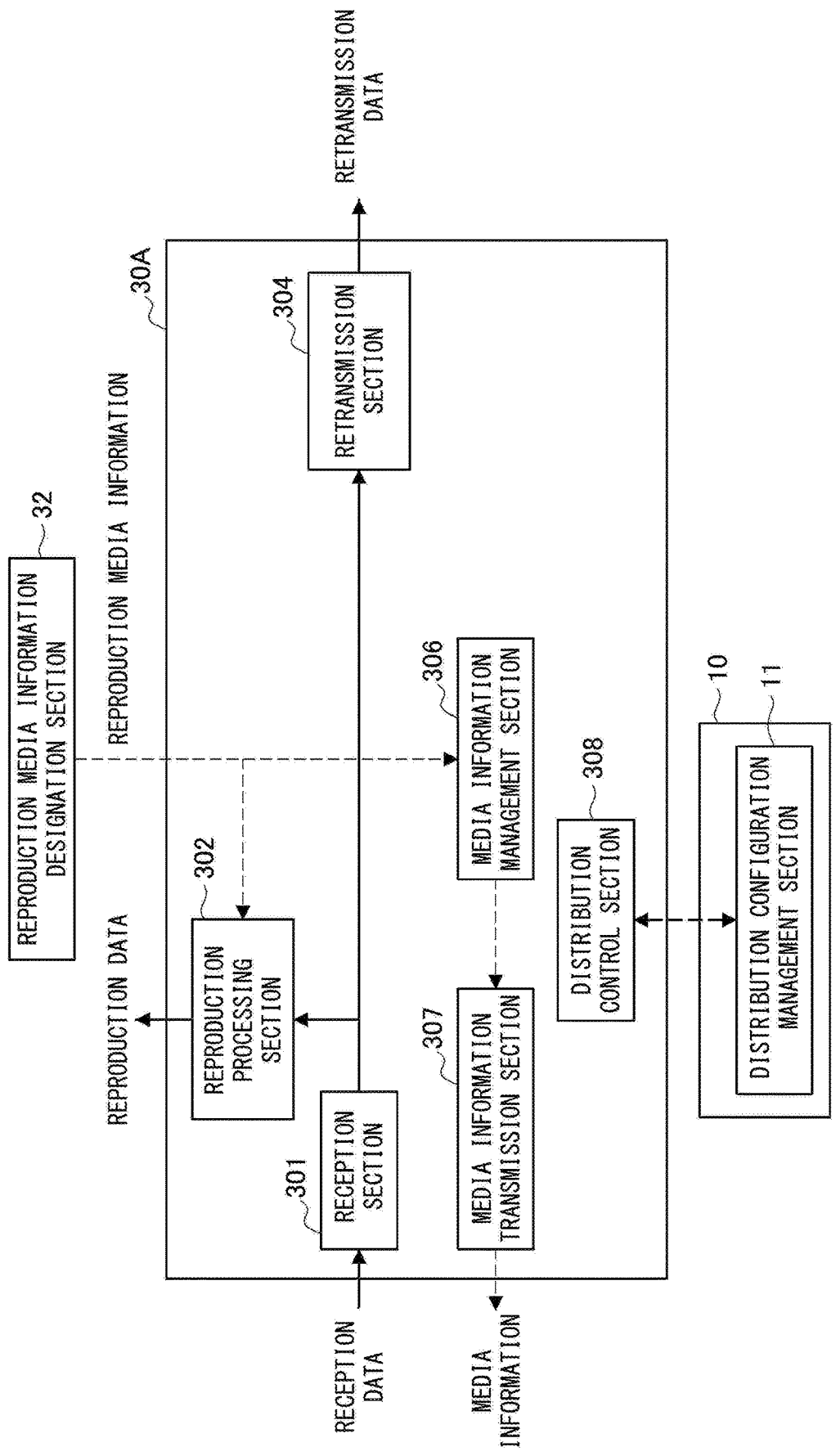
FIG. 11 is an internal configuration diagram illustrating an internal configuration of a reception node according to a second embodiment.

FIG. 11 is an internal configuration diagram illustrating an internal configuration of the reception node 30 according to the second embodiment.

As illustrated in FIG. 11, the reception node 30A according to the second embodiment includes the reception section 301, the playback processing section 302, the retransmission section 304, the media information management section 306, the media information transmission section 307, and the distribution control section 308.

The reception node 30A illustrated in FIG. 11 is configured in such a manner that at least the media type control section 303 is disabled or is not included (is omitted) out of the structural elements included in the reception node 30 according to the first embodiment. In addition, if necessary, the media information reception section 303 may also be disabled or does not have to be included (may be omitted) in addition to the media type control section 303. FIG. 11 illustrates the reception node 30A from which the media type control section 303 and the media information reception section 305 are omitted.

Next, functions specific to the reception node 30A according to the second embodiment (that is, functions different from the reception node 30 according to the first embodiment) will be mainly described.

The reception node 30A directly notifies the multimedia distribution management server 10 of media information including playback media information indicating a media type requested to be played by its own node. In other words, the media information management section 306 of the reception node 30A manages the playback media information designated by a user of the own node, and the media information transmission section 307 transmits the media information including only the playback media information of its own node to the multimedia distribution management server 10.

Note that, the media information transmission section 307 may transmits, to the multimedia distribution management server 10, media information to which information indicating that the own node does not include at least the media type control section 303 is attached, to cause the multimedia distribution management server 10 to recognize that the own node does not include at least the media type control section 303.

The reception node 30A does not include the media type control section 303.

Therefore, the reception node 30A transmits distribution data received by the reception section 301 as it is to a child node in the case where the reception node 30A functions as a relay node that redistributes the distribution data to the child node.

[Multimedia Distribution Management Server]

Figure 12:
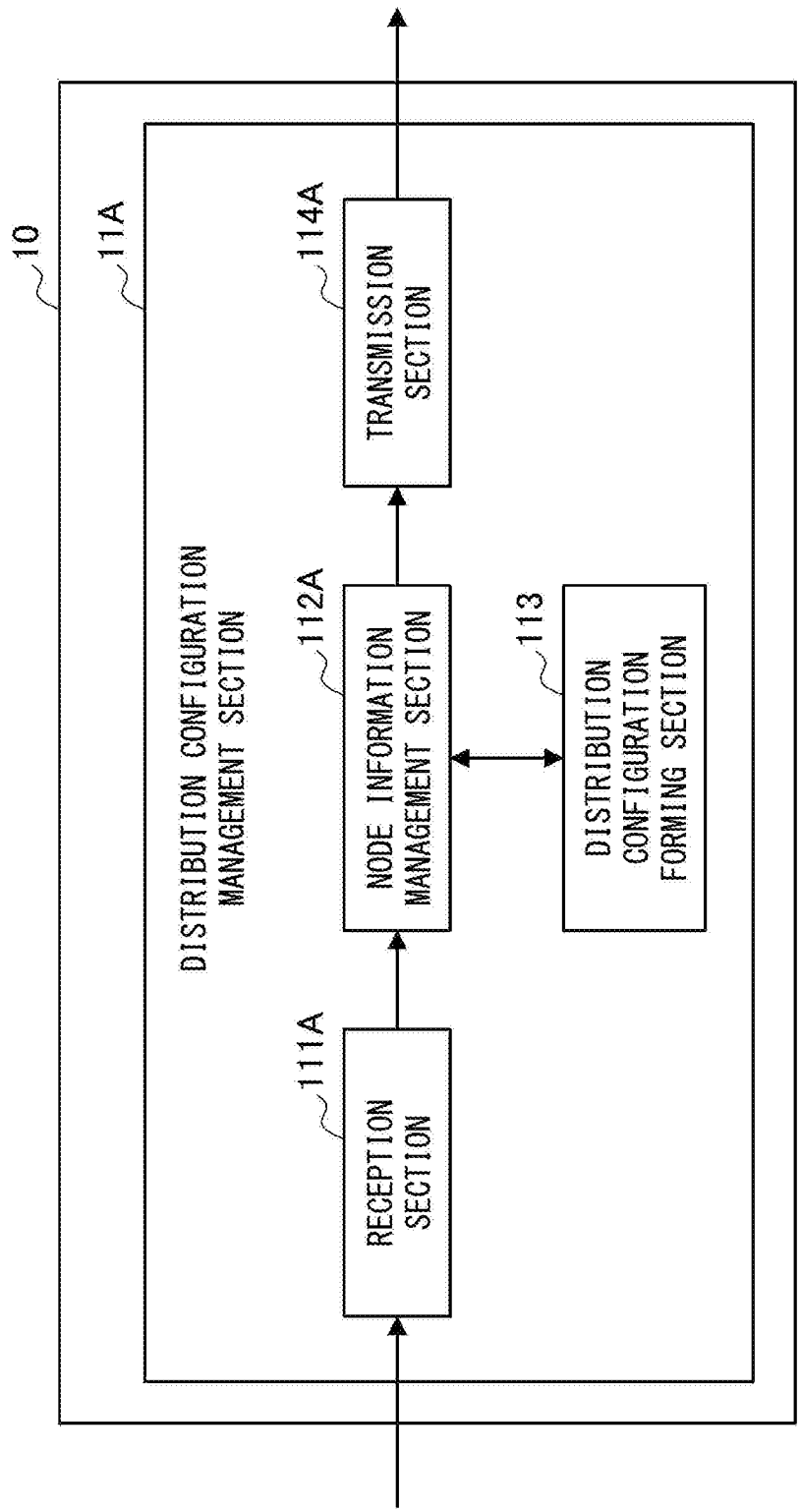
FIG. 12 is an internal configuration diagram illustrating an internal configuration of a multimedia distribution management server according to the second embodiment.

FIG. 12 is an internal configuration diagram illustrating an internal configuration of the multimedia distribution management server 10 according to the second embodiment.

In FIG. 12, the multimedia distribution management server 10 according to the second embodiment includes a distribution configuration management section 11A. The distribution configuration management section 11A includes a reception section 111A, a node information management section 112A, the distribution configuration forming section 113, and a transmission section 114A.

In a way similar to the first embodiment, the reception section 111A receives node information including information related to media types from respective nodes (distribution source node 20 and reception nodes 30).

The node information management section 112A manages node information of the respective nodes received by the reception section 111A. In addition, the node information management section 112A functions as the media information management section that manages playback media information including the media types requested by the respective reception nodes. The media types are included in the node information of the respective nodes. Specifically, the node information management section 112A manages information in which pieces of identification information of the respective nodes are associated with the media types requested to be played by the respective nodes.

In a way similar to the first embodiment, the transmission section 114A transmits the information related to the respective distribution paths acquired from the node information management section 112A to the distribution source node 20 and the respective reception nodes 30. In addition, the transmission section 114A transmits the media information to a node including the media information reception section 205 and the media information reception section 305 (node that includes the media information reception section 205 and the media information reception section 305 and performs functions thereof) out of respective nodes constituting the distribution tree.

In the first embodiment, the case where the media information is exchanged between the nodes connected via respective distribution paths in the distribution tree and the each node notifies its parent node of the media information in which its child nodes and its descendant nodes on a route are integrated, has been described.

In contrast to the first embodiment, the multimedia distribution management server 10 according to the second embodiment is configured to mediate exchange of corresponding media information between the respective nodes connected via the respective distribution paths. In other words, the multimedia distribution management server 10 may transmit, to each node, media information of a node that is a connection partner of each node on the basis of each distribution path in the distribution tree.

For example, in the case where the multimedia distribution management server 10 relays the media information, the media information transmission section 307 of the reception node 30 or the reception node 30A may transmit only playback media information of its own node, the multimedia distribution management server 10 may integrate pieces of media information related to each reception node 30 or each reception node 30A in accordance with a state of the structure of the distribution tree, and the integrated information may be transmitted to the media information reception section 305 or the media information reception section 205. In other words, the multimedia distribution management server 10 may transmit, to the parent node in the distribution tree, media information obtained by integrating pieces of playback media information of child nodes and descendant nodes of the parent node.

When the multimedia distribution management server 10 is configured as described above and the media type control section 303 is omitted from the reception node 30, media information from child nodes is unnecessary. Therefore, it is also possible to omit the media information reception section 305, and the multimedia distribution management server 10 does not have to transmit the media information to such a reception node 30A.

The case of omitting the media type control section 303 from the reception node 30A has been described above. In this case, sometimes media that is not requested may be transmitted to nodes below the child nodes, but sometimes this may reduce processing load on the reception node 30A.

In addition, when the multimedia distribution management server 10 is configured to relay media information between respective nodes as described above, it is possible for the multimedia distribution management server 10 to recognize which playback media each node included in the distribution tree is requesting.

In addition, the multimedia distribution management server 10 may be configured in such a manner that a media type that the distribution source node 20 is capable of providing and playback media information of the reception node 30 itself are reported as pieces of node information reported by the distribution source node 20 or the reception node 30 when newly participating in the distribution tree, and thereby the multimedia distribution management server 10 recognizes a media type requested by each node.

(B-2) Effects of Second Embodiment

According to the second embodiment, it is possible for the multimedia distribution management server to recognize media types requested to be played by respective nodes, and to efficiently construct a distribution tree in view of the media types in addition to the effects described with regard to the first embodiment.

(C) Other Embodiments

The various kinds of modifications of the present invention have been described in the above-described embodiments. In addition, the present is also applicable to modifications as follows.

(C-1) The present invention is not limited to the above-described embodiments. The present invention is applicable to various kinds of other multimedia distribution systems.

For example, the present invention is applicable to multimedia distribution including distribution of various kinds of data such as simultaneous distribution of documents, presentation data, or the like in addition to the video and audio data. In other words, the present invention is applicable to a system that controls combinations of various kinds of media such as media whose media types are controlled depending on types of combinations of video, audio, and data, or media including a plurality of types of audio (for example, the audio is classified by language) in addition to the types of video and audio described in the above-described embodiments.

(C-2) The present invention can be implemented as a system or devices configured as described above, or a program that executes the processes performed by the respective devices included in the above-described system.

For example, the present invention can be implemented as a server device (server program) that configures a system by deploying a downloadable program (such as a JavaScript (registered trademark) program) that achieves the functions of the distribution source node and the reception node on a server (such as a web server or the multimedia distribution management server), and downloading the program to a PC, a web browser, or the like.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A communication device included in a plurality of nodes that constitute a distribution tree of a data distribution system for distributing multimedia data, the multimedia data including media data of a plurality of media types, the communication device redistributing media data of at least one media type included in the multimedia data, which is received from a distribution source device that is another node of the distribution tree and/or a device outside the distribution tree to descendant nodes among the plurality of nodes, the descendant nodes of the communication device being on a same route of the communication device in the distribution tree and including a child node of the communication device, each node of the distribution tree having media information indicating at least one designated media type that is played thereon, the communication device comprising:

a computing device; and
a storage medium containing program instructions stored therein, execution of which by the computing device causes the communication device to provide the functions of:
    a processing section configured to play and output the media data of the at least one designated media type included in the multimedia data, the at least one designated media type of media data corresponding to the media information of the communication device;
    a media information storage section configured to store the media information of the communication device as own media information, and
        the media information of descendant nodes as descendant media information indicating at least one designated media type of media data included in the multimedia data that is played on each of the descendant nodes;
    a media type control section configured to select as selected media data, from the multimedia data media data of one or more distribution media types, the selected media data being selected on a basis of the descendant media information when distributing at least one media type of the media data to the child node of the communication device; and
a redistribution section configured to redistribute by the media type control section to the child node of the communication device, the selected media data.

2. The communication device according to claim 1, wherein the functions further comprise:
a media information reception section configured to receive the descendant media information from the child node of the communication device, and cause the media information storage section to store the received descendant media information; and
a media information transmission section configured to transmit the received descendant media information that is held in the media information storage section, to the distribution source device or to a parent node of the communication device that is on the same route of the communication device in the distribution tree.

3. A distribution source device that constitutes, together with a plurality of nodes each being a communication device, a distribution tree of a data distribution system for distributing multimedia data, which includes media data of a plurality of media types, to one or more descendant nodes among the plurality of nodes, the one or more descendant nodes of the distribution source device being on a same route of the distribution source device in the distribution tree, each node of the distribution tree having media information indicating at least one designated media type of media data played thereon, the distribution source device comprising:
a computing device; and
a storage medium containing program instructions stored therein, execution of which by the computing device causes the distribution source device to provide the functions of:
a media information storage section configured to store media information as requested media information, indicating media data of at least one designated media type that is requested by at least one requested node among the one or more descendant nodes and is to be directly distributed to the at least one requested node along the distribution tree;
a media type control section configured to select media data of one or more distribution media types from the multimedia data as requested media data, on a basis of the requested media information; and
a distribution section configured to distribute, to the at least one requested node, the requested media data selected by the media type control section.

4. The distribution source device according to claim 3, wherein the functions further comprise
a media information reception section configured to receive from the respective descendant nodes media information as descendant media information, indicating the at least one designated media type of media data that is played on the respective descendant nodes, and cause the media information storage section to store the received descendant media information.

5. A data distribution system for distributing multimedia data including media data of a plurality of media types, the data distribution system having a distribution tree formed by a plurality of nodes, comprising:
the distribution source device according to claim 3;
the plurality of nodes forming the distribution tree, each node being a communication device, and distributing the media data of at least one media type included in the multimedia data, received from the distribution source device or another device outside the distribution system, to one or more descendant nodes among the plurality of nodes, the one or more descendant nodes of each node being on a same route of said each node of the distribution tree, said each node of the distribution tree having media information indicating at least one designated media type of media data played thereon; and
a communication control device configured to control communication between the distribution source device and the respective nodes of the distribution tree, wherein one or more nodes among the plurality of nodes of the distribution tree each include
a computing device; and
a storage medium containing program instructions stored therein, execution of which by the computing device causes the communication device to provide the functions of:
a playback processing section configured to play and output the media data of the at least one designated media type that is played thereon,
a media information storage section configured to store the media information as own media information, indicating the at least one designated media type of media data that is played by the playback processing section, and media information of one or more descendant nodes that are on the same route of said each node of the distribution tree as descendant media information, indicating media data of at least one designated media type that is played on each of the one or more descendant nodes,
a media type control section configured to select media data of one or more of distribution media types from the multimedia data as selected media data, on a basis of the own media information and the descendant media information stored in the media information storage section when distributing the media data of the at least one media type included in the multimedia data, to the one or more descendant nodes, and
a redistribution section configured to redistribute by the media type control section, to the one or more descendant nodes, the selected media data each node includes
a node information acquisition section configured to acquire node information of the distribution source device as source node information, and to acquire node information as requested descendant node information, of one or more requested descendant nodes that request distribution to the distribution source device of the media data of the at least one media type included in the multimedia data,
a node information storage section configured to store the source node information and the requested node information,
a distribution configuration forming section configured to construct a current distribution tree formed by the distribution source device and the requested nodes on a basis of the source node information and the requested descendant node information, and
a transmission section configured to transmit information related to distribution paths between respective nodes in the current distribution tree, the respective-nodes of the current distribution tree.

6. The data distribution system according to claim 5, wherein
one of the plurality of nodes is a first communication device that does not includes the media type control section but includes a first communication section that is configured to transmit, to the communication control device, media information that includes only the own media information of the first communication device, and
when the communication control device receives media information that includes only the own media information from the first communication device, the communication control device transmits to the first communication device media information of the one or more descendant nodes of the first communication device indicating at least one designated media type of media data that is played on each of the respective descendant nodes.

7. The data distribution system according to claim 6, wherein the communication control device transmits, to a parent node of the first communication device, the media information of the first communication device and the media information of the one or more descendant nodes of the first communication device in accordance with a structure of the current distribution tree with regard to the first communication device.

8. The data distribution system according to claim 5, wherein
one of the plurality of communication devices-is a first communication device that does not include the media type control section but includes a first communication section that is configured to transmit, to the communication control device, media information that-includes only the own media information of the first communication device, and
when the communication control device receives from the first communication device media information that includes only own media information, the communication control device transmits multimedia data that includes only media types indicated by the own media information of the first communication device to the first communication device.

* * * * *